(12) United States Patent
Nakajima et al.

(10) Patent No.: US 7,035,788 B1
(45) Date of Patent: Apr. 25, 2006

(54) LANGUAGE MODEL SHARING

(75) Inventors: Yutaka Nakajima, Redmond, WA (US); Yutaka Suzue, Issaquah, WA (US); Kevin B. Gjerstad, Seattle, WA (US); Dong-Hui Zhang, Beijing (CN); Hiroaki Kanokogi, Hachioji (JP); Benjamin M. Westbrook, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/557,741

(22) Filed: Apr. 25, 2000

(51) Int. Cl.
*G06F 17/27* (2006.01)

(52) U.S. Cl. .................. 704/9; 704/231; 704/257; 704/1

(58) Field of Classification Search .................. 704/1, 704/9, 10, 251, 250, 202, 219, 231, 232, 704/255, 257; 707/10; 715/533
See application file for complete search history.

(56) References Cited

U.S. PATENT DOCUMENTS

| | | | | |
|---|---|---|---|---|
| 4,651,289 A | * | 3/1987 | Maeda et al. | 704/244 |
| 5,659,771 A | * | 8/1997 | Golding | 715/533 |
| 5,692,097 A | * | 11/1997 | Yamada et al. | 704/241 |
| 6,052,525 A | * | 4/2000 | Carlson et al. | 717/100 |
| 6,073,097 A | * | 6/2000 | Gould et al. | 704/251 |
| 6,167,377 A | * | 12/2000 | Gillick et al. | 704/240 |
| 6,285,785 B1 | * | 9/2001 | Bellegarda et al. | 382/187 |
| 6,308,187 B1 | * | 10/2001 | DeStefano | 715/526 |
| 6,363,348 B1 | * | 3/2002 | Besling et al. | 704/270.1 |
| 6,393,398 B1 | * | 5/2002 | Imai et al. | 704/254 |
| 6,415,258 B1 | * | 7/2002 | Reynar et al. | 704/275 |

OTHER PUBLICATIONS

Harry Newton, Newton's Telecom Dictionary, 1996, Flatiron Publishing, Tenth Edition, p. 793, 794.*

* cited by examiner

*Primary Examiner*—Richemond Dorvil
*Assistant Examiner*—Lamont Spooner
(74) *Attorney, Agent, or Firm*—Shook, Hardy & Bacon

(57) ABSTRACT

The sharing of language models is disclosed. In one embodiment, a language model service is provided that is shareable among handlers for input devices. The service includes a pre-processing mode of operation, and a correction mode of operation. In the former mode, the language model service is designed to receive a range within a document from a handler for an input device, and in response provide advice regarding text under consideration by the handler to insert within the document at the range, based on the context of the document within the range. In the latter mode, the language model service is designed to supervise correction over a range of text within a document, in which a number of different handlers for a number of different input devices were initially responsible for insertion of the text, such that the service solicits suggestions from the handlers, and based thereon determines text corrections. The corrections can then be made by the handlers, or by the service.

20 Claims, 7 Drawing Sheets

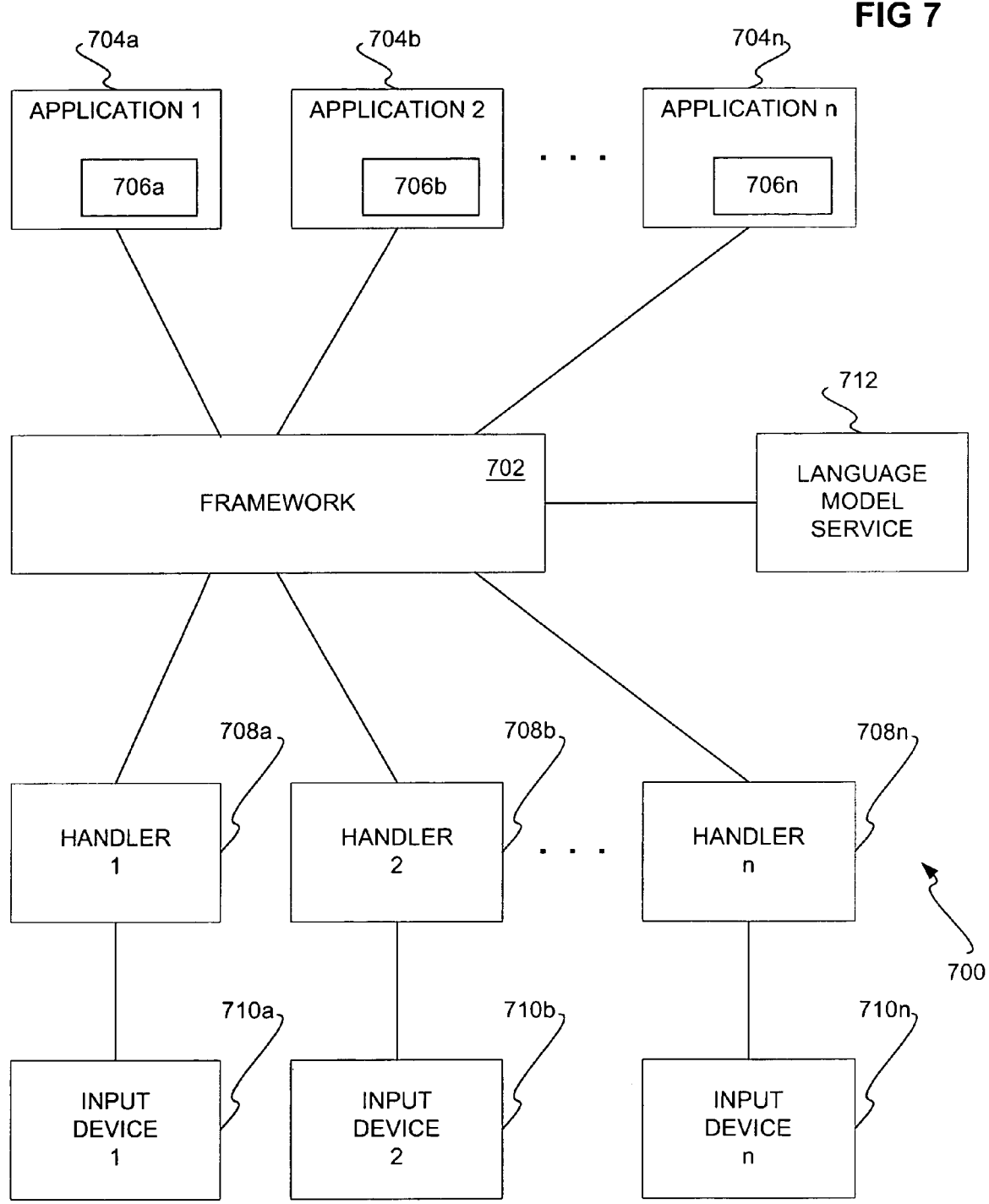

LANGUAGE MODEL SHARING

FIELD OF THE INVENTION

This invention relates generally to language models, such as language models used in conjunction with handwriting and voice recognition, as well as other recognition applications such as East Asian recognition application and other technologies that utilize a statistical language model, and more particularly to the sharing of such language models.

BACKGROUND OF THE INVENTION

A common application today is the entering, editing and manipulation of text. Application programs that perform such text operation include word processors, text editors, and even spreadsheets and presentation programs. For example, a word processor allows a user to enter text to prepare documents such as letters, reports, memos, etc.

While the keyboard has historically been the standard input device by which text input is performed into these type of application programs, it is currently being augmented and/or replaced by other types of input devices. For example, touch-sensitive pads can be "written" on with a stylus, such that a handwriting recognition program can be used to input the resulting characters into a program. As another example, voice-recognition programs, which work in conjunction with microphones attached to computers, also are becoming more popular. Especially for non-English language users, these non-keyboard type devices are popular for initially inputting text into programs, such that they can then be edited by the same device, or other devices like the keyboard.

Each of these alternative types of text entry typically has associated with it a language model, which is used to recognize the speech or handwriting input, for example, and translate the input to text. Within the prior art, each different type of input has its own language model. This is usually necessary, because the particularities associated with recognizing speech input, for example, are typically different than the particularities associated with recognizing handwriting input, for example. However, the models can be complementary. As an example, a language model tuned for speech recognition may utilize more contextual information to determine what a user intended to be spoken, while a language model tuned for handwriting recognition may only recognize handwriting on a character-by-character basis. The prior art, however, does not provide for sharing of such different language models.

For this and other reasons, therefore, there is a need for the present invention.

SUMMARY OF THE INVENTION

This invention relates to the sharing of language models. In one embodiment, a language model service is provided that is shareable among handlers (i.e., drivers, processors, or other computer programs) for input devices. The service includes a pre-processing mode of operation, and a correction mode of operation. In the former mode, the language model service is designed to receive a range within a document from a handler for an input device, and in response provide advice regarding text under consideration by the handler to insert within the document at the range, based on the context of the document within the range. In the latter mode, the language model service is designed to supervise correction over a range of text within a document, in which a number of different handlers for a number of different input devices were initially responsible for insertion of the text, such that the service solicits suggestions from the handlers, and based thereon determines text corrections. The corrections can then be made by the handlers themselves, or by the service itself.

Embodiments of the invention provide for advantages not found within the prior art. In the pre-processing mode of operation, for example, a handwriting recognition handler may solicit advice from the language model service regarding the context in which a particular character of text is to be inserted into a document, so that the prediction made by the handler as to the particular character can be better informed, and thus more accurate. In the correction mode of operation, for example, by supervising corrections over a range of text that was initially inserted into the document by different input device handlers, the language model service can coordinate the corrections, and hence provide for better informed and thus more accurate text corrections.

The invention includes computer-implemented methods, machine-readable media, computerized systems, and computers of varying scopes. Other aspects, embodiments and advantages of the invention, beyond those described here, will become apparent by reading the detailed description and with reference to the drawings.

DETAILED DESCRIPTION OF THE INVENTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated.

It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as processing or computing or calculating or determining or displaying or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Operating Environment

Figure 1:
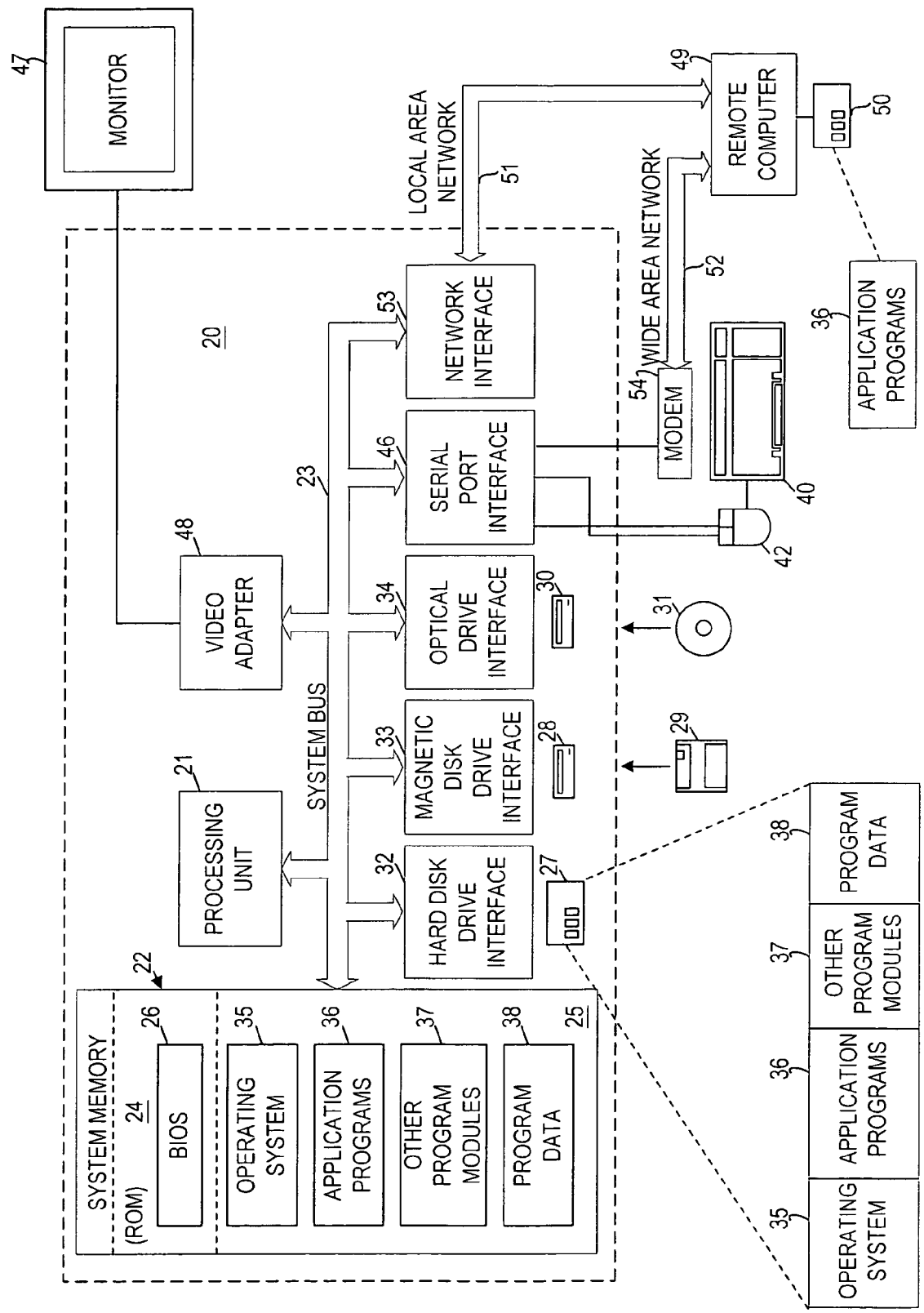
FIG. 1 is a diagram of an operating environment in conjunction with which embodiments of the invention can be practiced.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PC's, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components include the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in office networks, enterprise-wide computer networks, intranets and the Internal, which are all types of networks.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

Pre-Processing Mode

In this section of the detailed description, a pre-processing mode of a language model service, according to an embodiment of the invention, is described. The pre-processing mode is designed to receive a range of text within a document from a handler for an input device, and in response, provide to the handler advice regarding the text under consideration by the handler to insert within the document at the range. The advice is based on the context of the document within the range.

Figure 2:
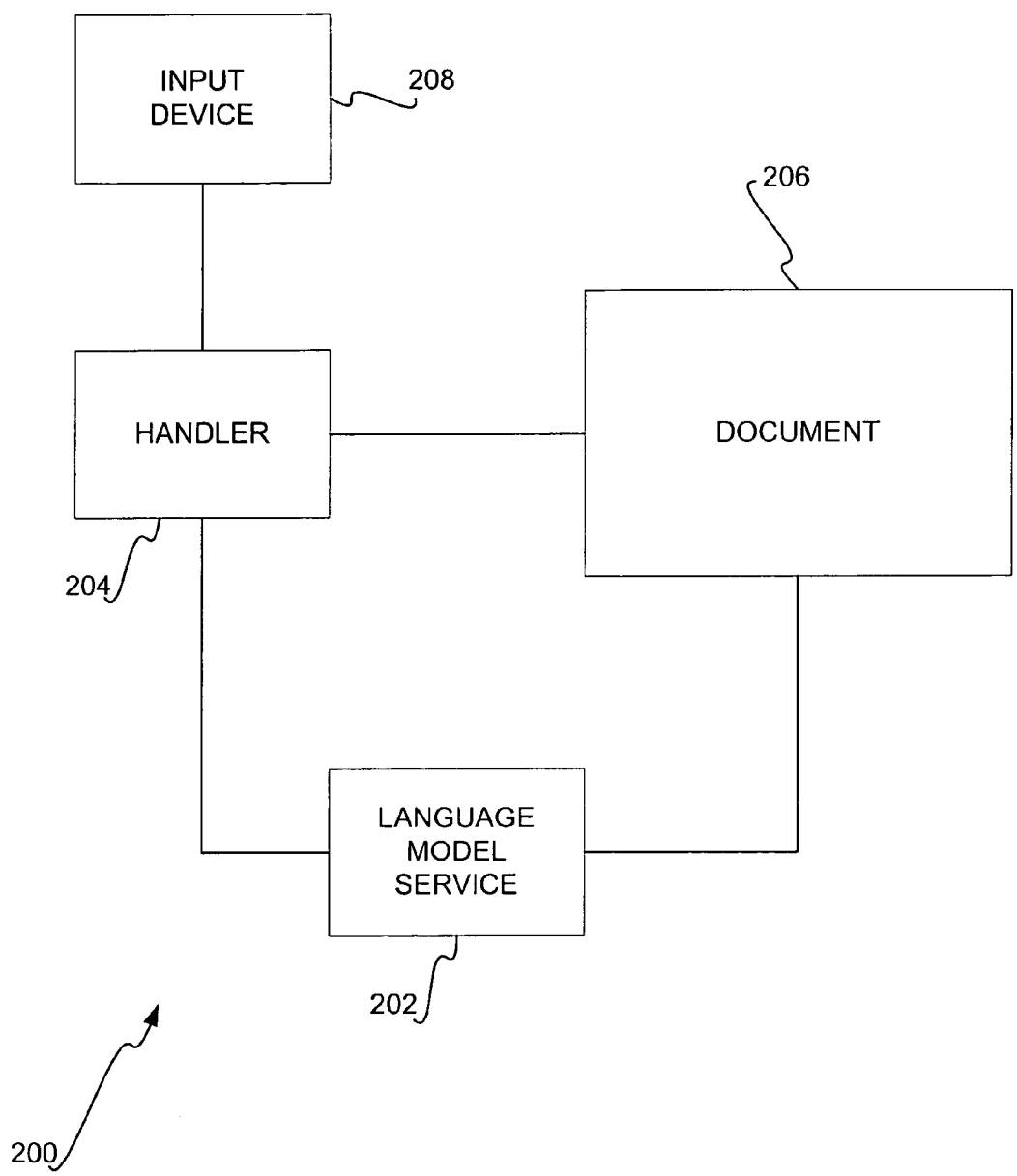
FIG. 2 is a diagram of a system for a pre-processing mode of operation, according to an embodiment of the invention.

Referring to FIG. 2, a diagram of a system 200 in which a pre-processing mode of operation is accomplished, according to an embodiment of the invention, is shown. The system 200 includes a language model service 202, a handler 204, a document 206, and an input device 208. The handler 204 is a computer program, also referred to as a driver or a processor, for the input device 208, such that it receives the raw data from the input device 208, and based thereon injects text into the document 206. For example, the input device 208 can be a touch-sensitive pad on which a user writes using a stylus, such that the handler 204 recognizes the handwriting as a character of text to be inserted into the document 206. As another example, the input device 208 can be a microphone into which the user speaks, such that the handler 204 recognizes the speech as a word of text to be inserted into the document 206.

The handler 204 in one embodiment has a resident, or internal, language model, not shown in FIG. 2, which it utilizes to translate the raw data received from the input device 208 to translate into text to inject into the document 206 at the specified range. Such language models are known within the art. For example, in the context of a handwriting recognition handler, the language model can be (but does not have to be) character based, where the language model looks at the user input and translates it into a text character. As another example, in the context of a speech recognition handler, the language model is typically word based, where the language model looks at the user input and translates it into a word of text. To improve the accuracy of the translation, the handler 204 relies on the language model service 202.

The language model service 202 receives a specified range of text within the document 206 from the handler 204, and in response provides advice to the handler 204 regarding proposed text under consideration to input into the document 206 at the range. The language model service 202 in one embodiment encompasses a language model, such as known within the art. For example, the language model can be lattice based, where a lattice is a type of data structure used within language models. In such an embodiment, the language model service 202 provides what is known in the art as a best path through the lattice back to the handler 204 for the handler 204 to have its own language model consider when determining on the text to insert into the document 206.

Thus, the language model service 202 in the case of the pre-processing mode of operation of FIG. 2 is subservient to the handler 204, and does not actually insert text into the document 206 itself. Rather, the handler 204 communicates with the language model service 202, to obtain, for example, a best path through the lattice of the language model of the service 202, and uses this information in conjunction with its own language model to determine what text to insert into the document 206, which it performs itself By relying on the language model service 202, the handler 204 desirably has improved accuracy as to its recognition of the input received from the input device 208. For example, in the case of handwriting recognition, the handler 204 may have a language model that is character based, while the service 202 has a language model that is word based. The word-based language model of the service 202 thus provides additional information as to the character that the handler 204 is contemplating inserting into the document 206.

As an example, the handler 204 may be inserting text into the document 206 at a range already including the beginning of a word "th". Based on the input from the input device 208, the handler 204 may have determined based on its own character language model that the best match for the input is a letter "z", with 20% probability, and that the second-best match for the input is a letter "r", with 15% probability. Without utilizing the language model service 202, therefore, the handler 204 is likely to enter the letter "z" into the document 206 at the specified range, after the letters "th". However, it is noted that few words in the English language beginning with the letters "thz", so this is likely incorrect.

A further example is described that is word based. The handler 204 may have two candidates, "dog" and "dos" that it passes to the language model service 202. The service 202 can access the document 206 and determine that the range in question is surrounded by "The <target> chased the cat" where <target> will be either "dog" or "dos". Thus, the service 202 can increase the probability that the correct word is "dog" instead of a "dos".

However, in accordance with embodiments of the invention, the handler 204 also requests the language model service 202 to consider the range and also come up with the best character to insert next, based on the specified range. The service 202 examines this range of text within the document, which is "th", and based thereon has a best match "e" with 85% probability, say, and a second best match "r" with 75% probability. It returns this information to the handler 204. The handler 204 may then decide that since its own language model came up with best matches at the significantly lower probabilities of 20% and 15%, it would yield to the matches determined by the service 202. However, the handler 204 may also then determine, since the best match of the service 202, "e" with 85% probability, is not within the best matches provided by its own language model, while the second-best match of the service 202, "r" with 75% probability, is within the best matches provided by its own language model, that the best character to insert into the document 206 is the letter "r".

That is, the handler 204 has a language model in this example that is character based, and thus does not consider the context of the range of the document 206 into which text is to be injected. It may not have an additional language model that is word based for space, performance, or other considerations. However, by relying on the generic language model service 202, it is able to make use of the word-based language model of the service 202, to complement its own word-based character model. Thus, the language model service 202 acts to augment and complement the model of the handler 204 in this embodiment of the invention. As has been noted, however, the service 202 is subservient to the handler 204—the service 202 only provides advice as requested by handlers such as the handler 204, and does not itself insert text into the document 206.

As shown in FIG. 2, in one embodiment of the invention, interaction with the document 206 is accomplished directly by both the handler 204 and the language model service 202. However, the invention itself is not so limited. For example, in another embodiment of the invention, each of the handler 204 and the language model service 202 interact with the document 206 via a common text framework that provides an abstraction of the document 206 for interaction with the handler 204 and the service 202. Such a common text framework permit applications that own documents such as the document 206, referred herein as owning applications, to expose their documents as abstractions to handlers and services such as the handler 204 and the service 202. In one embodiment, the service 202 can be considered a special type of input device handler, not having an actual input device, but which communicates with the framework as if it were a handler. A common text framework in conjunction with which embodiments of the invention can be implemented is particularly described in the cofiled, copending and coassigned patent application entitled "Common Text Framework" Ser. No. 09/557,738.

Figure 3:
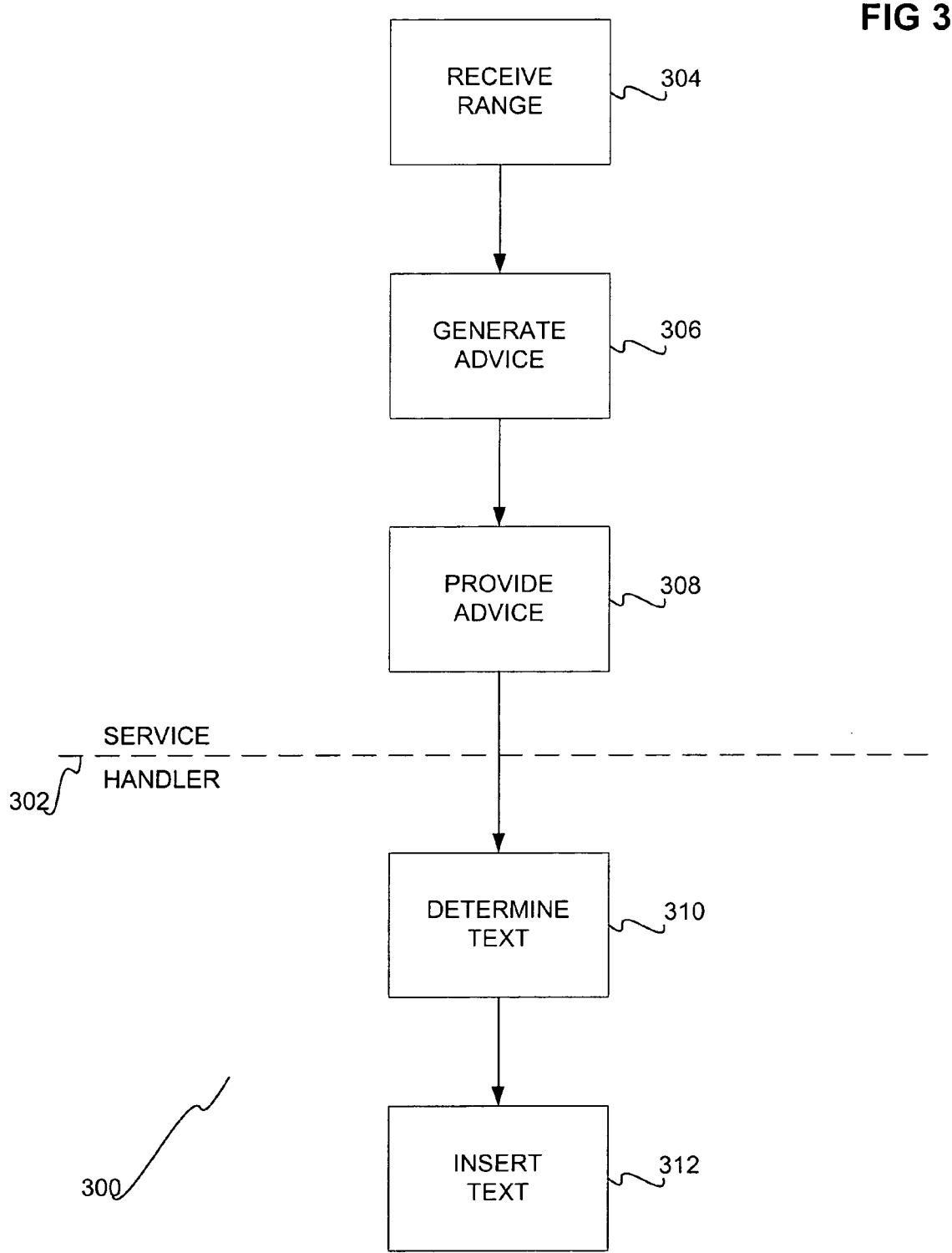
FIG. 3 is a flowchart of a method for a pre-processing mode of operation, according to an embodiment of the invention.

Referring next to FIG. 3, a flowchart of a method 300, according to an embodiment of the invention, is shown. The method 300 can in one embodiment be computer-implemented. The computer-implemented method is desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer. The program or programs can be a part of a computer system or a computer, such as that described in conjunction with FIG. 1 in a previous section of the detailed description.

The invention is not so limited, however. As demarcated in FIG. 3 by the dotted-line 302, the parts 304, 306 and 308 of the method 300 are performed by a language model service, while the parts 310 and 312 of the method 300 are performed by an input device handler. In 304, the language model service receives, in a pre-processing mode of operation, a range within a document from the handler. In 306, the language model service generates advice regarding the text under consideration by the handler to insert within the document at the range. In one embodiment, this is accomplished as has been described—for example, the service references the range within the document 206, and generates a best path through a lattice for the specified range. In 308, the language model service provides the advice back to the handler, such as returning the best path back to the handler.

In 310, the handler then determines the text to insert within the document at the range, based on the advice provided by the language model service, as well as on the raw data it received from the input device. As has been described, for instance, the handler may compare probabilities of the best path received from the language service and the best path it determined itself as to its own language model's lattice. In 312, the handler then inserts the text it determined in 310 into the document at the specified range.

In one embodiment, the method 300 can be implemented in conjunction with a common text framework as has been described. Thus, in 306, the language model service accesses the text within the range of the document via the framework, through an abstraction of the document as exposed by an owning application of the document also via the framework. In 312 as well, the handler inserts the text at the range of the document via the framework, also through the abstraction of the document as exposed by the owning application also via the framework. It is noted that the invention is not so limited to this embodiment, however.

Correction Mode

In this section of the detailed description, a correction mode of a language model service, according to an embodiment of the invention, is described. The correction mode is designed to supervise correction over a range of text within a document, in which a number of different handlers for a number of different input devices were initially responsible for insertion of the text. The language model service solicits suggestions from the different handlers and based thereon determines text corrections, to be made either by the service itself or by the handlers themselves.

Figure 4:
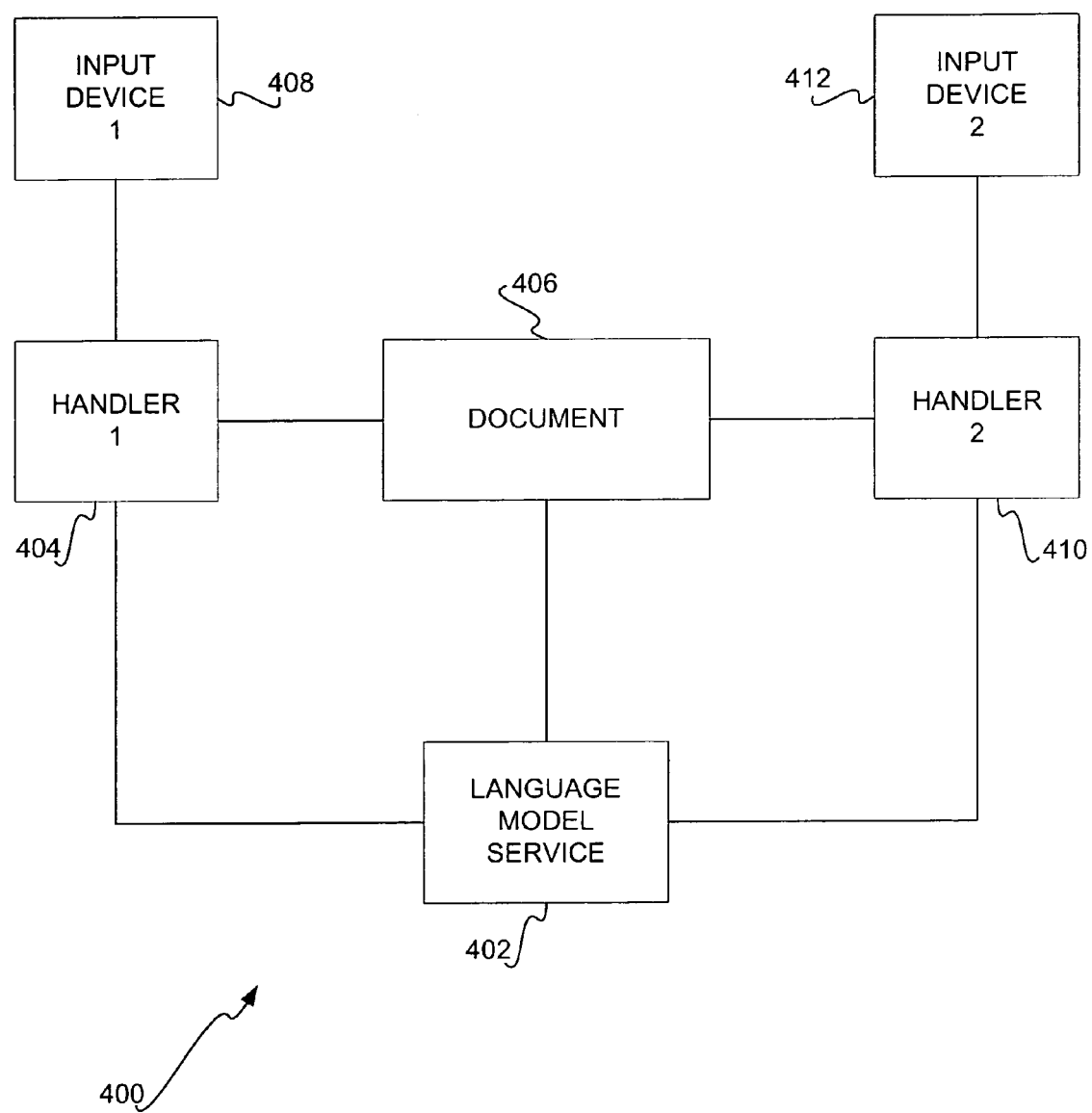
FIG. 4 is a diagram of a system for a correction mode of operation, according to an embodiment of the invention.

Referring to FIG. 4, a diagram of a system 400 in which a correction mode of operation is accomplished, according to an embodiment of the invention, is shown. The system 400 includes a language model service 402, a first handler 404 for a first input device 408, a second handler 410 for a second input device 412, and a document 406. Each of the handlers 404 and 410 are a computer program, also referred to as a driver or a processor, for the input devices 408 and 410, respectively, such that they receive raw data from their respective input devices, and based thereon inject text into the document 206. For example, the first input device 408 may be a touch-sensitive pad on which a user writes using a stylus, such that the handler 404 recognizes the handwriting as a character of text to be inserted into the document 406. As another example, the second input device 412 may be a microphone into which the user speaks, such that the handler 410 recognizes the speech as a word of text to be inserted into the document 406.

As described in the previous section of the detailed description, the handlers 404 and 410 can in one embodiment each have a resident, or internal, language model, not shown in FIG. 4, that they utilize to translate the raw data received from their respective input devices to translate into text to inject into the document 406. Such language models are known within the art. For example, in the context of a handwriting recognition handler, the language model is typically character based, where the language model looks at the user input and translate it into a text character. As another example, in the context of a speech recognition handler, the language model is typically word based, where the language model looks at the user input and translates it into a word of text.

The language model service 402 can of FIG. 4 be the same language model service 202 of FIG. 2 that was described in the previous section of the detailed description. However, operation in the correction mode of operation is different than the pre-processing mode of operation. In the correction mode of operation, the language model service 402 supervises corrections over a range of text within a document, where the range encompasses text initially inserted by different handlers. The service 402 solicits suggestions from the different handlers as to what corrections should be made, and based on these suggestions, as well as in one embodiment suggestions made by its own language model, determines the corrections that should be made. The service 402 in one embodiment makes these corrections itself, while in another embodiment the service 402 pushes the determined corrections back to the appropriate handlers, requesting them to make the corrections.

Thus, the language model service 402 is a "master" language model as compared to the language models of the handlers 404 and 410. Each of the handlers 404 and 410 typically only makes decisions as to what a given range of text should be based on the raw data its corresponding input device provided, and does not consider, for example, the range of text for which the other handler is responsible. The language model service 402 in the correction mode of operation provides for overseeing these handlers, so that the corrections they make are desirably consistent with those of the other handler. It is noted that the correction mode of operation is desirably performed after initial text has been inserted by various handlers into a document, such as in conjunction with the pre-processing mode described in the previous section of the detailed description. Once text has been so inserted into the document, request for re-conversion of the text can then desirably be handled by the language model service in the correction mode. In one embodiment, the language model service can also provide for a common correction user interface to govern corrections made by the user, although the invention is not so limited.

Figure 5:
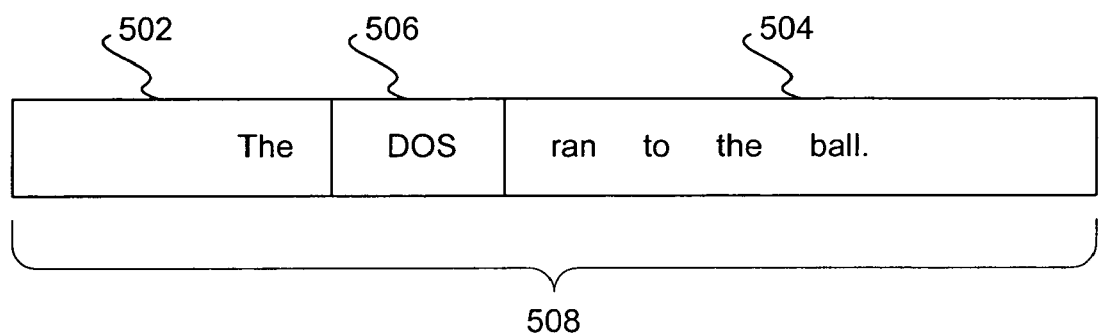
FIG. 5 is a diagram of an example sentence of text in which a correction mode of operation can be utilized to make corrections thereto, according to an embodiment of the invention.

An example sentence of text 500, as shown in the diagram of FIG. 5, is considered. The text 500 is the sentence "The DOS ran to the ball.", where the ranges of text 502 and 504, corresponding to the words "The" and "ran to the ball.", were inserted by a handwriting recognition handler, while the range of text 506, corresponding to the word "DOS", was inserted by a speech recognition handler. The user has entered a correction mode, and is requesting that range of text 508, which encompasses the ranges 502, 504 and 506, be re-converted. In the correction mode, the language model service supervises corrections to the text. Thus, the service first requests advice, such as lattice best paths as described in the previous section of the detailed description, for the ranges 502, 504 and 506, from the handwriting recognition and the speech recognition handlers, where the former handler provides advice as to the ranges 502 and 504, and the latter handler provides advice as to the range 506. For sake of this example, it is assumed that the handwriting recognition handler provides a best lattice path of "The" for the range 502 with 95% probability, and a best lattice path of "ran to the ball" for the range 504 also with 95% probability. However, the speech recognition handler provides two best lattice paths for the range 506—"DOS" (as in the computer-related acronym for "disk operating system") with 25% probability, and "dog" with 20% probability.

Having solicited these suggestions (which in one embodiment are thus paths through lattices of the appropriate handlers), the language model service is then able to run the suggestions against its own language model. Doing so may yield that the path "The DOS ran to the ball." has a significantly lower probability than the path "The dog ran to the ball.". As a result, the language model service is likely to determine that the word "DOS" in the range 506 should be changed to the word "dog", especially since the speech recognition handler had relatively comparable and low probabilities for the words "DOS" and "dog". In one embodiment, the language model service makes this correction to the range 506 itself. However, in another embodiment, the language model service sends the correction back to the speech recognition handler, since it was originally responsible for inserting the word "DOS" in the document.

As described in the previous section of the detailed description, interaction with the document by the handlers and the language model service can be either directly accomplished, through a common text framework, etc.; the invention is not so limited. For example, each of the handlers and the language model service can in one embodiment interact with a document via a common text framework that provides an abstraction of the document for interaction with the handlers and the service. Such a common text framework, as has been described, permits applications that own documents, referred to as owning applications, to expose their documents as abstractions to handlers and services. Furthermore, as has also been described, in one embodiment the language model service acting as a master in the correction mode of operation is considered a special type of input device handler, not having an actual input device, but communicating with the framework as if it were a handler. A common text framework in conjunction with which embodiments of the invention can be implemented is described in the cofiled, copending and coassigned patent application entitled "Common Text Framework" Ser. No. 09/557,738.

Figure 6:
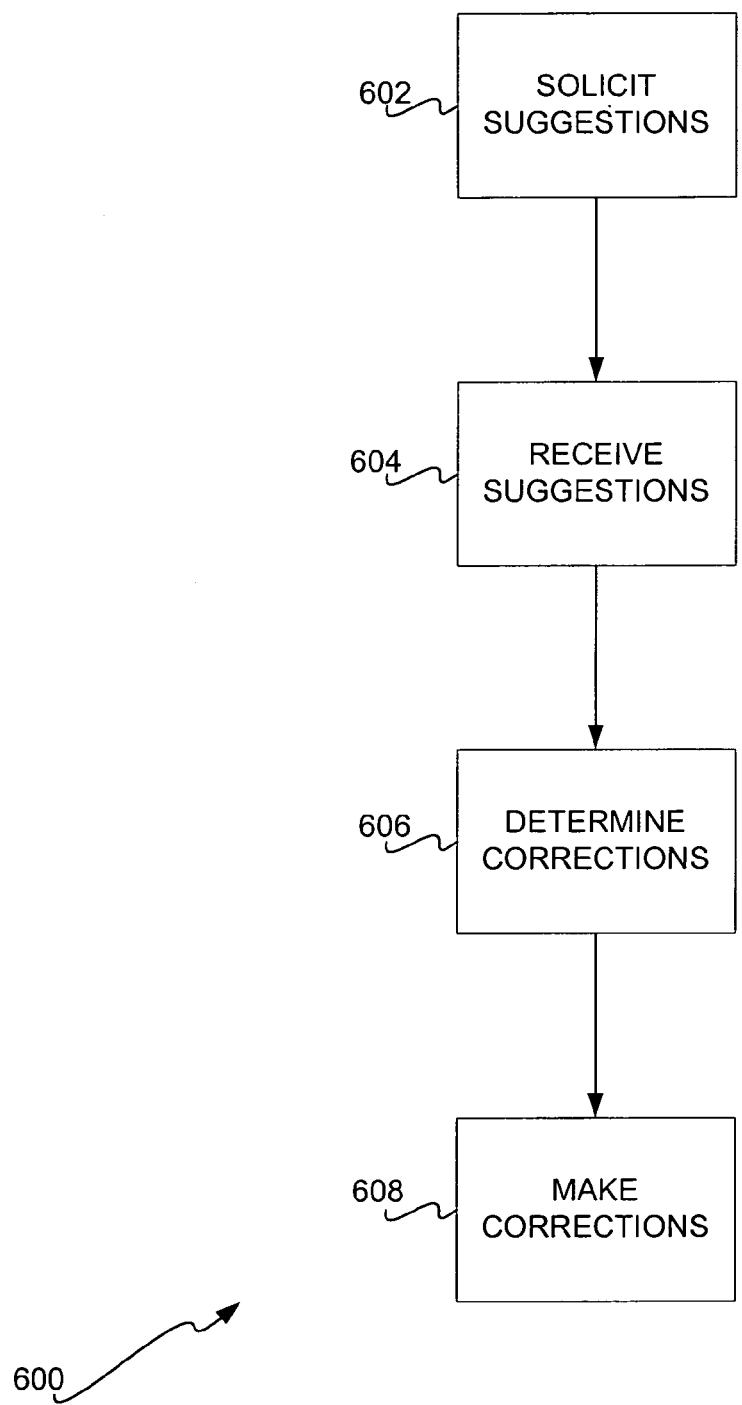
FIG. 6 is a flowchart of a method for a correction mode of operation, according to an embodiment of the invention; and, FIG. 7 is a diagram of a system according to an embodiment of the invention.

Referring next to FIG. 6, a flowchart of a method 600, according to an embodiment of the invention, is shown. The method 600 can in one embodiment be computer-implemented. The computer-implemented method is desirably realized at least in part as one or more programs running on a computer—that is, as a program executed from a computer-readable medium such as a memory by a processor of a computer. The programs are desirably storable on a machine-readable medium such as a floppy disk or a CD-ROM, for distribution and installation and execution on another computer. The program or programs can be a part of a computer system or a computer, such as that described in conjunction with FIG. 1 in a previous section of the detailed description. The invention is not so limited, however.

In 602, the language model service, in a correction mode of operation, solicits suggestions over a range of text within a document, where a number of different handlers were initially responsible for insertion of the text within the range (i.e., within a number of ranges within this range). In 604, the language model service receives the suggestions back from the different handlers. In one embodiment, these suggestions are various path(s) through language model lattices of the handlers, with varying degrees of probability of being the actual text intended to be inserted by the user. In 606, the language model service determines any correction(s) to be made to the range of text, based on the suggestions solicited and received from the input device handlers, and also its own internal, or resident, language model.

Finally, in 608, the corrections are made, where in one embodiment the corrections are made by the language model itself, whereas in another embodiment the corrections are sent back to the appropriate input device handlers that were originally responsible for insertion of the text within the range. As has been described, in one embodiment, access to the text of the document, such as the making of corrections thereto, is made via a common text framework, through an abstraction of the document as exposed by an owning application via the common text framework, although the invention itself is not so limited.

Pre-Processing and Correction Modes of Operation

In this section of the detailed description, embodiments of the invention are presented in which a language model service is operative in both the pre-processing and correction modes, as these modes have been described in previous sections of the detailed description. A particular embodiment is described in which handlers and a language model service interact with documents owned by application programs via a common text framework. This description is made with reference to the diagram of FIG. 7.

The system 700 of FIG. 7 includes a common text framework 702, that provides for interactivity among applications 704a, 704b, . . . , 704n, and input device handlers 708a, 708b, . . . , 708n. Each of the application programs 704a, 704b, . . . , 704n is a program that has a document of primarily text. Such programs include, for example, word processors, text editors, as well as spreadsheets, presentation managers, etc.; the invention is not so limited. Application programs 704a, 704b, . . . , 704n have corresponding documents 706a, 706b, . . . , 706n, and expose their documents to the framework as abstractions to the framework 702, as opposed to, for example, the internal representation of the documents 706a, 706b, . . . , 706n.

Input device handlers 708a, 708b, . . . , 708n are the handlers, also referred to as processors or drivers, for corresponding input devices 710a, 710b, . . . , 710n. Such input devices include, for example, keyboards, touch pads on which text is "written" using a stylus and then handwriting-recognized by their corresponding handlers, microphones into which words are spoken and then voice-recognized by their corresponding handlers, etc.; the invention is not so limited. Input device handlers 708a, 708b, . . . , 708n access the abstractions of the documents and insert additional text into the documents via the framework 702. Each of the handlers desirably has its own language model, as has been described.

Thus, the framework 702 is a mechanism by which application programs and input devices, through their handlers, can interact with one another on a common basis. In one embodiment, the framework 702 is the common text framework described in the copending, coassigned and cofiled patent application entitled "Common Text Framework" Ser. No. 09/557,738. The invention is not so limited, however. Furthermore, the language model service 712 desirably has a language model, and is shareable among the handlers 708a, 708b, . . . , 708n, and is operable in pre-processing mode, and a correction mode, as has been described in previous sections of the detailed description. In one embodiment, the service 712 is a computer program, such as may be stored as instructions on a machine-readable medium, such as a memory, a hard disk drive or other fixed storage, a CD-ROM or other removable storage, etc.; the invention is not so limited.

CONCLUSION

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the claims and equivalents thereof.

We claim:

1. A machine-readable medium having instructions stored thereon for execution by a processor to implement a computer program providing a language model service shareable among handlers for input devices, comprising:

a pre-processing mode of operation in which the language model service is designed to receive a range within a document from a handler for an input device and in response provide to the handler advice regarding text under consideration by the handler to insert within the document at the range, the advice being for consideration by the handler, wherein the handler relies on a first language model for determining text entry and the language model service relies on a second language model distinct from the first language model, the second language model related to a context of the document within the range, wherein the handler determines and enters text in order to create the document after considering conclusions of the first language model and the second language model; and, a correction mode of operation in which the language model service is designed to supervise correction over a range of text within a document in which a number of different handlers for a number of different input devices were initially responsible for insertion of the text, such that the language model service solicits suggestions from the different handlers and after considering the suggestions of the number of different handlers and the second language model, the language model service determines text corrections.

2. The medium of claim 1, wherein the advice provided by the language model service to the handler for the input device in the pre-processing mode of operation comprises a best path through a lattice maintained by the language model service.

3. The medium of claim 1, wherein the text corrections determined by the language model service in the correction mode of operation are made by the language model service itself.

4. The medium of claim 1, wherein the text corrections determined by the language model service in the correction mode of operation are returned to the different handlers such that the different handlers are requested to make the text corrections themselves.

5. The medium of claim 1, wherein the suggestions solicited by the language model service from the different handlers in the correction mode of operation comprise paths through lattices maintained by the different handlers.

6. The medium of claim 1, wherein the language model service interacts with a common text framework to access the document.

7. The medium of claim 6, wherein the language model service accesses the document through an abstraction of the document exposed by an owning application via the common text framework.

8. A machine-readable medium having instructions stored thereon for execution by a processor to implement a computer program providing a language model service shareable among handlers for input devices, comprising:

a pre-processing mode of operation in which the language model service is designed to receive from a handler for an input device a range within a document of an owning application, access to the document being through an abstraction of the document exposed by the owning application via a common text framework, and in response provide to the handler advice regarding text under consideration by the handler to insert within the document at the, the advice being for consideration by the handler, wherein the handler relies on a first language model for determining text entry and the language model service relies on a second language model distinct from the first language model, the second language model related to a context of the document within the range, wherein the handler determines and enters text in order to create the document after considering conclusions of the two language models; and, a correction mode of operation in which the language model service is designed to supervise correction over a range of text within a document in which a number of different handlers for a number of different input devices were initially responsible for insertion of the text, such that the language model service solicits suggestions from the different handlers and after considering the suggestions of the number of different handlers and the second language model, the language model service determines text corrections.

9. The medium of claim 8, wherein the text corrections determined by the language model service in the correction mode of operation are made by the language model service itself via the common text framework through the abstraction of the document exposed by the owning application.

10. The medium of claim 8, wherein the text corrections determined by the language model service in the correction mode of operation are returned to the different handlers such that the different handlers are requested to make the text corrections themselves, such that the different handlers make the text corrections via the common text framework through the abstraction of the document exposed by the owning application.

11. A computer-implemented method comprising:
soliciting suggestions over a range of text within a document by a language model service implementing a first language model in a correction mode of operation in which a number of different handlers for a number of different input devices were initially responsible for insertion of the text, each of the different handlers implementing a language model distinct from the first language model;
receiving the suggestions by the language model service from the different handlers; and
determining corrections to the text by the language model service after considering the first language model and the suggestions received from the different handlers;
wherein the document was initially created in a pre-processing mode of operation in which the language model service received a range within a document from each of the different handlers and in response provided to each of the handlers advice regarding text under consideration by the handlers to insert within the document at the range, the advice being for consideration by the handlers, wherein the language model service relied on the first language model, and wherein each of the handlers determined and entered text in order to create the document after considering conclusions of the first language model and another language model.

12. The method of claim 11, further comprising making the corrections by the language model service itself.

13. The method of claim 12, wherein the corrections are made by the language model service via a common text framework through an abstraction of the document as exposed by an owning application via the common text framework.

14. The method of claim 11, further comprising:
receiving the corrections by the different handlers from the language model service; and
making the corrections by the different handlers themselves.

15. The method of claim 14, wherein the corrections are made by the language model service via a common text framework through an abstraction of the document as exposed by an owning application via the common text framework.

16. The method of claim 11, wherein access to the range of text of the document by the language model service and the different handlers is through an abstraction thereof as exposed by an owning application via a common text framework.

17. The method of claim 11, wherein the suggestions solicited by the language model service from the different handlers comprise paths through lattices maintained by the different handlers.

18. A computerized system for initial text entry and for text correction, the system comprising:
a plurality of handlers, each handler for an input device and able to enter text into a document; and
a language model service shareable among the plurality of handlers, comprising:
a pre-processing mode of operation in which the language model service is designed to receive a range within the document from a handler and in response provide to a handler advice regarding text under consideration by the handler to insert within the document at the range, the advice for consideration by the handler, wherein the handler relies on a first language model for determining text entry and the language model service relies on a second language model distinct from the first language model, the second language model related to a context of the document within the range, wherein the handler determines and enters text in order to create the document after considering conclusions of the two language models; and
a correction mode of operation in which the language model service is designed to supervise correction over a range of text within a document in which more than one of the plurality of handlers were initially responsible for insertion of the text, such that the language model service solicits suggestions from the more than one of the plurality of handlers and after considering the suggestions of said more than one of the plurality of handlers and the second language model, the language model service determines text corrections,
such that the text corrections determined by the language model service in the correction mode of operation are made to the text by one of: the language model service and the more than one of the plurality of handlers.

19. The system of claim 18, wherein the plurality of handlers and the language model service interacts with a common text framework to access the document.

20. The system of claim 19, wherein the plurality of handlers and the language model service accesses the document through an abstraction of the document exposed by an owning application via the common text framework.

* * * * *

UNITED STATES PATENT AND TRADEMARK OFFICE
CERTIFICATE OF CORRECTION

| | |
|---|---|
| PATENT NO. | : 7,035,788 B1 |
| APPLICATION NO. | : 09/557741 |
| DATED | : April 25, 2006 |
| INVENTOR(S) | : Yutaka Nakajima et al. |

It is certified that error appears in the above-identified patent and that said Letters Patent is hereby corrected as shown below:

In column 6, line 14, delete "itself" and insert -- itself. --, therefor.

In column 7, line 46, delete "The invention is not so limited, however." and insert -- The invention is not so limited, however. --, therefor on line 45 after "description." as continuation of the paragraph.

In column 12, line 63, in Claim 8, delete "the," and insert -- the range, --, therefor.

Signed and Sealed this

Twenty-fifth Day of August, 2009

David J. Kappos
*Director of the United States Patent and Trademark Office*